(12) United States Patent
Nakano

(10) Patent No.: US 6,486,614 B1
(45) Date of Patent: Nov. 26, 2002

(54) DISCHARGE LAMP LIGHTING DEVICE

(75) Inventor: Tomoyuki Nakano, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/830,406

(22) PCT Filed: Oct. 2, 2000

(86) PCT No.: PCT/JP00/06843

§ 371 (c)(1),
(2), (4) Date: Apr. 27, 2001

(87) PCT Pub. No.: WO01/24588

PCT Pub. Date: Apr. 5, 2001

(30) Foreign Application Priority Data

Sep. 30, 1999 (JP) .......................... 11-280157
Oct. 26, 1999 (JP) .......................... 11-304091

(51) Int. Cl.[7] .............................. H05B 41/14
(52) U.S. Cl. ....................... 315/289; 315/291
(58) Field of Search ................. 315/289, 291, 315/56, 57, 59, 60, 61, 70, 209 R, 209 M, 119, 127; H05B 41/14

(56) References Cited

U.S. PATENT DOCUMENTS

| | | | | |
|---|---|---|---|---|
| 3,780,342 A | * | 12/1973 | Grimshaw et al. .......... 315/173 |
| 4,286,193 A | * | 8/1981 | King, Jr. et al. ............. 315/175 |
| 5,113,330 A | | 5/1992 | Makita ........................ 362/265 |
| 5,124,895 A | * | 6/1992 | Segoski et al. .............. 362/265 |
| 5,188,444 A | * | 2/1993 | Makita et al. ................. 362/80 |
| 5,426,346 A | * | 6/1995 | Allison ................. 315/209 CD |
| 5,629,588 A | * | 5/1997 | Oda et al. ................... 315/308 |
| 5,838,109 A | | 11/1998 | Kobayashi et al. ........... 315/58 |
| 5,925,983 A | * | 7/1999 | Toda et al. .................. 319/119 |
| 5,936,361 A | * | 8/1999 | Yamashita et al. .......... 315/308 |
| 5,973,457 A | * | 10/1999 | Yamashita et al. .......... 315/225 |
| 6,066,921 A | * | 5/2000 | Nakamura et al. ............. 315/71 |
| 6,161,951 A | * | 10/2000 | Yoneyama et al. .......... 362/516 |

FOREIGN PATENT DOCUMENTS

| | | | | |
|---|---|---|---|---|
| EP | 0 542 425 A1 | * | 5/1993 | ........... H05B/41/42 |
| JP | 63-62187 | | 3/1988 | ........... H05B/41/24 |
| JP | 4-79196 | | 3/1992 | ........... H01B/41/24 |
| JP | 6-36297 | | 5/1994 | ........... H05B/41/18 |
| JP | 7-106079 | | 4/1995 | ........... H05B/41/24 |
| JP | 7-249496 | | 9/1995 | ........... H05B/41/29 |
| JP | 8-41738 | | 2/1996 | ........... D01H/7/02 |
| JP | 8-64432 | | 3/1996 | ........... H01F/30/00 |
| JP | 8-315630 | | 11/1996 | ........... F21V/23/00 |
| JP | 9-82551 | | 3/1997 | ........... H01F/41/06 |
| JP | 10-241794 | | 9/1998 | ........... H05B/41/16 |
| JP | 2 909 867 | | 4/1999 | ........... H05B/41/29 |
| JP | 11-185982 | | 7/1999 | ........... H05B/41/18 |

* cited by examiner

Primary Examiner—Don Wong
Assistant Examiner—Trinh Vo Dinh
(74) Attorney, Agent, or Firm—Burns, Doane, Swecker & Mathis, LLP

(57) ABSTRACT

A discharge lamp lighting device capable of minimizing the dimensions and weight of socket and decreasing costs is to be provided.

The discharge lamp lighting device is provided with a power supply line for supplying a power to a discharge-lamp starting circuit in addition to a pair of output lines for discharge-lamp lighting outputs from a lighting circuit, and is arranged for supplying the power from the lighting circuit through the power supply line, auxiliary electrode of the lamp socket, outer peripheral electrode and output lines to the starting circuit, to thereby realize the dimensional and weight minimization and the cost reduction.

22 Claims, 9 Drawing Sheets

DISCHARGE LAMP LIGHTING DEVICE

TECHNICAL FIELD

This invention relates to a lighting device for such discharge lamps as automotive head lamps.

BACKGROUND OF THE INVENTION

The discharge lamp lighting device of the kind referred to has been disclosed in, for example, Japanese Patent Laid-Open Publication No. 8-298190 (corresponding to U.S. Pat. No. 6,066,921), in which the device comprises a lighting circuit which controls a source power from a DC power source to a required power of a voltage for the discharge lamp and converts it into an AC stabilized, a starting circuit for generating a required high voltage (for example, 20 kV) for starting the discharge lamp, and a lamp fixture for supporting the discharge lamp.

When the discharge lamp lighting device thus constituted is caused to operate in a state where the discharge lamp is not connected as yet, there occurs a phenomenon of discharging between electrodes to which the discharge lamp is to be connected, due to the high voltage (such as 20 kV) generated at the starting circuit.

Another conventional example which prevents the above phenomenon is disclosed in Japanese Patent Laid-Open Publication No. 8-41738, in which a lamp socket 1 incorporates in a casing behind a socket section 1a a starting circuit 2 constituted by a pulse transformer 2a and an igniter main circuit 2b for generating a pulse voltage at a primary winding of the pulse transformer 2a, a lighting circuit 5 comprising an inverter circuit for converting a source power of a DC power source 9 into an AC power is connected at one output line 4a to an outer electrode 6 in the socket section 1a and at the other output line 4b through a secondary winding 2P to a central electrode 7 in the center of the socket section 1a. The igniter main circuit 2b is constituted by connecting one of a pair of source side terminals for receiving a supplied power to a junction point between the lighting circuit 5 and the secondary winding 2P of the pulse transformer 2a, and the other to an auxiliary electrode 8 in the socket section 1a. This known device is so constituted that, when the discharge lamp (not shown) is mounted to the socket section 1a, the auxiliary electrode 8 is connected through a conducting part of the discharge lamp to the outer electrode 6 to supply the power from the lighting circuit 5 to the igniter main circuit 2b to cause the starting circuit 2 to operate, whereas, when the discharge lamp is not mounted as yet, the power is not supplied to the igniter main circuit 2b, and the starting circuit 2 will not be actuated.

When in this case, as disclosed in Japanese Patent No. 2,909,867, a high voltage circuit constituted by a starting winding of the transformer, rectifying circuit, resistor and diode for supplying the power to the starting circuit is provided to a DC boosting circuit of the light circuit, it is possible to supply a high voltage suitable for a pulse generation to the starting circuit (starting pulse generating circuit), and the pulse generating transformer and the like in the starting circuit can be dimensionally minimized.

While the foregoing discharge lamp lighting device according to Japanese Patent Laid-Open Publication No. 8-41738 can restrain the starting circuit from being actuated in the state where the discharge lamp is not mounted and is safer than the discharge lamp lighting device according to Japanese Patent Laid-Open Publication No. 8-298190, the arrangement remains in that the power supply to the igniter main circuit 2b of the starting circuit 2 is made by a direct application of the output voltage of the lighting circuit 5, so that the voltage applied to the igniter main circuit 2b of the starting circuit 2 cannot be optionally selected (in such lighting circuit as shown in FIG. 9 of Japanese Patent Laid-Open Publication No. 6-349586, for example, a voltage two times as high as the voltage supplied from the lighting circuit is applied to the primary side of the pulse transformer), the pulse transformer 2a for generating the high voltage pulse is required to be one large in the turn ratio, and as a result the pulse transformer 2a is enlarged in the dimensions. Otherwise, it is required to provide in the starting circuit 2 a boosting circuit, consequent to which the number of electronic parts increases to be enough for occupying a larger housing space.

Further, it has been unable to realize a safe lighting device only by providing the boosting circuit for the supply to the starting circuit in the lighting circuit in attempt to minimize the dimensions of the starting circuit as disclosed in Japanese Patent No. 2,909,867 since, in the event when the discharge lamp is not mounted, a high voltage of several ten kV (such as about 20 kV) is applied to the output end of the socket when the source power is supplied to the lighting device.

In the event where the pulse transformer which is heavy is incorporated in the lamp socket of the type incorporating the starting circuit or the lamp socket is dimensionally enlarged, there arise risks that, as the automotive head lamp, the optical axis of the discharge lamp is apt to be deviated due to vibration during the running, so as to be a cause of hindering the optical axis from being stable as shown in Japanese Patent Laid-Open Publication No. 8-315630, or that the high pulse voltage is applied to the output end of the socket when the discharge lamp is not mounted so as to be in lack of the safety as shown in Japanese Patent No. 2,909,867.

SUMMARY OF THE INVENTION

It is an object of the present invention to provide a discharge lamp lighting device minimized in dimensions and weight of the socket, decreased in the costs and made highly safe, by overcoming the foregoing problems.

According to the present invention, the above object is established by the device characterized in comprising a discharge lamp, a lighting circuit for lighting the discharge lamp, and a socket for mounting the discharge lamp and including a starting circuit for causing the discharge lamp to be lighted, wherein the lighting circuit has a pair of output lines for use with lighting outputs for stably lighting the discharge lamp and connected at least at one through the starting circuit to the discharge lamp, and a power supply means arranged for supplying the power to the starting circuit when the discharge lamp is mounted to the socket is additionally provided.

Other objects and advantages of the present invention shall become clear from the following description with reference to the embodiments shown in accompanying drawings.

While the present invention shall now be described with reference to the embodiments shown in the accompanying drawings, it should be appreciated that the intention is not to limit the present invention only to these embodiments but rather to include all alteration, modification and equivalent arrangements possible within the scope of appended claims.

BEST MODE FOR CARRYING OUT THE INVENTION

Figure 1:
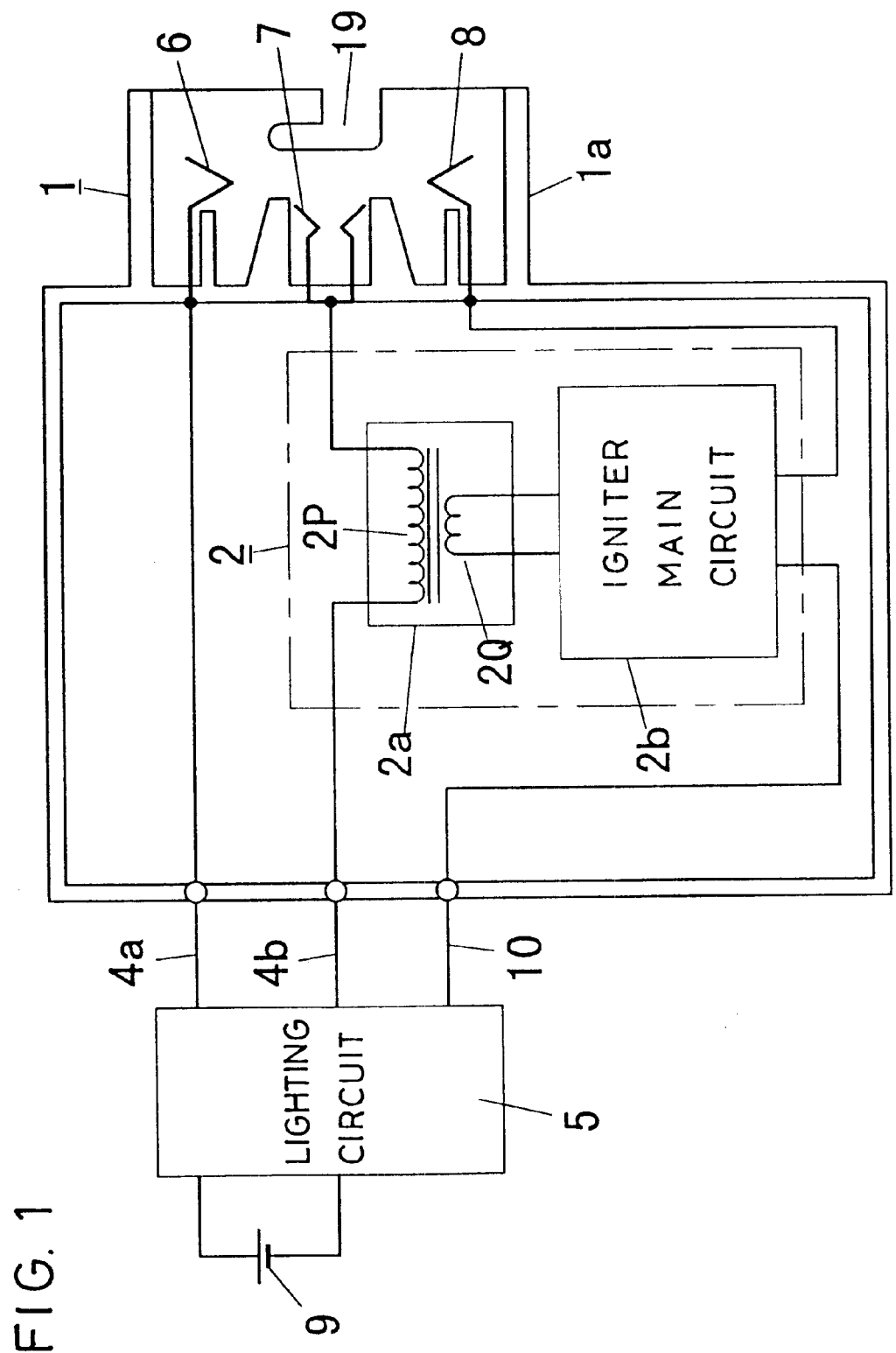
FIG. 1 is a circuit diagram in one embodiment of the discharge lamp lighting device according to the present invention.
Figure 2:
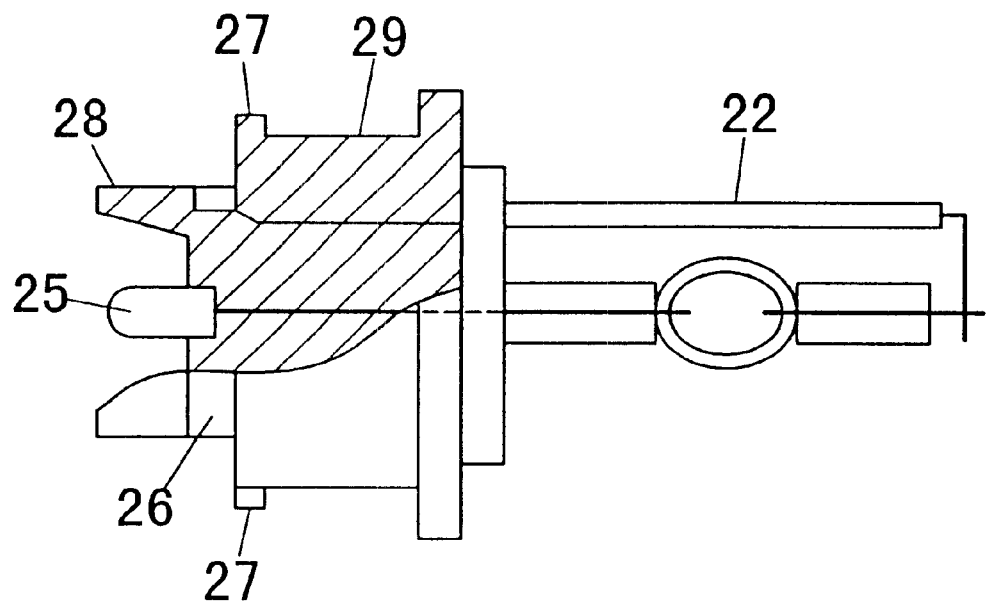
FIG. 2 is a partly sectioned view showing the structure of the discharge lamp in the embodiment of FIG. 1.

In FIGS. 1 and 2, an embodiment of the discharge lamp lighting device according to the present invention is shown, in which a pair of output lines 4a and 4b for lighting outputs for stably lighting the discharge lamp are connected between a lighting circuit 5 for lighting the discharge lamp and a lamp socket 1 to which the discharge lamp is mounted. In addition, a power supply line 10 for supplying a power to a starting circuit 2 and constituting a power supply means together with the output lines 4a and 4b is connected. Also, one of a pair of source side terminals of an igniter main circuit 2b is connected to the power supply line 10, and the arrangement is so made that a voltage of about 300 to 400 V, for example, is applied across the pair of output lines 4a and 4b upon starting the discharge lamp. The starting circuit 2 is constituted by a pulse transformer 2a and the igniter main circuit 2b and is disposed inside the lamp socket 1.

To a socket section 1a also of the lamp socket 1, a discharge lamp 22 shown in FIG. 2 is mounted. As shown in FIG. 2, the discharge lamp 22 has a lamp base 29, a central electrode 25 of the lamp base 29 for contact with a central electrode 7 of the lamp socket 1, an outer peripheral electrode 26 of the lamp base 29 for contact with an outer electrode 6 and auxiliary electrode 8 of the lamp socket 1, fixing pins 27 provided on the outer periphery of the lamp base 29 for holding the discharge lamp 22 to the lamp socket 1, and a peripheral wall 28 positioned on outer periphery of the center electrode 25.

The auxiliary electrode 8 of the lamp socket 1 is of the same structure as the outer electrode 6 and is provided coaxial with the outer electrode 6 with the central electrode 7 made center, so that, when the lamp base 29 of the discharge lamp 22 is mounted to the lamp socket 1, the outer electrode 6 and auxiliary electrode 8 will be mutually connected through the outer peripheral electrode 26 of the lamp base 29. Further, mounting slits 19 are provided to the lamp socket 1, so that the discharge lamp can be held to the lamp socket 1 with the fixing pins 27 fixed, by inserting and rotating the lamp base 29 of the discharge lamp 22 in the lamp socket 1. In this state where the discharge lamp 22 is mounted to the lamp socket 1, the output line 4b from the lighting circuit 5 is connected to the discharge lamp 22 through a secondary winding 2P of the pulse transformer 2a in the starting circuit 2 and the central electrode 7, and the output line 4a from the lighting circuit 5 is connected to the discharge lamp 22 through the outer electrode 6.

Since in the state where the discharge lamp 22 is connected to the lamp socket 1 the outer and auxiliary electrodes 6 and 8 of the lamp socket 1 are mutually connected through the outer peripheral electrode 26 of the lamp base 29 of the discharge lamp 22, a DC voltage is supplied to the igniter main circuit 2b of the starting circuit 2 through a path of the lighting circuit 5→power supply line 10→igniter main circuit 2a→auxiliary electrode 8→outer peripheral electrode 26 of the discharge lamp 22→outer electrode 6→output line 4a→lighting circuit 5, a high voltage is applied across the central and outer peripheral electrodes 25 and 26 of the discharge lamp 22 through the pulse transformer 2a, and the discharge lamp 22 is thereby caused to perform a discharge. In this way, the DC voltage is applied through the output line 4a of the lighting circuit 5 to the power supply line 10 toward the starting circuit 2, and this DC voltage supplies a power to the pulse transformer 2a for causing a high voltage pulse generated in the discharge lamp 22.

With the foregoing arrangement, it is enabled not to have any voltage applied to the igniter main circuit 2b of the starting circuit 2 in the event where the discharge lamp 22 is not mounted to the lamp socket 1, so as not to generate the high voltage pulse and to be safe also in no-load state, while the discharge lamp 22 is enabled to start as has been described, once the discharge lamp 22 is mounted to the lamp socket 1.

Since according to the present embodiment no power is supplied to the starting circuit 2 when the discharge lamp is not connected as yet to the lamp socket 1 and no high voltage pulse is generated between the electrodes of the lamp socket 1, it is possible to prevent any damage or accident of the lamp socket 1 from occurring. Since the supply line for supplying the power to the starting circuit 2 is additionally provided separately from the output lines 4a and 4b, it is possible to optionally set in the lighting circuit 5 the power supplied to the starting circuit 2. With the supply power optimumly set, the boosting ratio (turn ratio) of the pulse transformer 2a for the high voltage pulse generation can be so set as not to become larger, minimization in dimensions and weight and reduction of costs of the pulse transformer 2a can be attained, and it is possible to realize the minimization in dimensions and weight and cost reduction of the lamp socket 1 incorporating the transformer.

Figure 3:
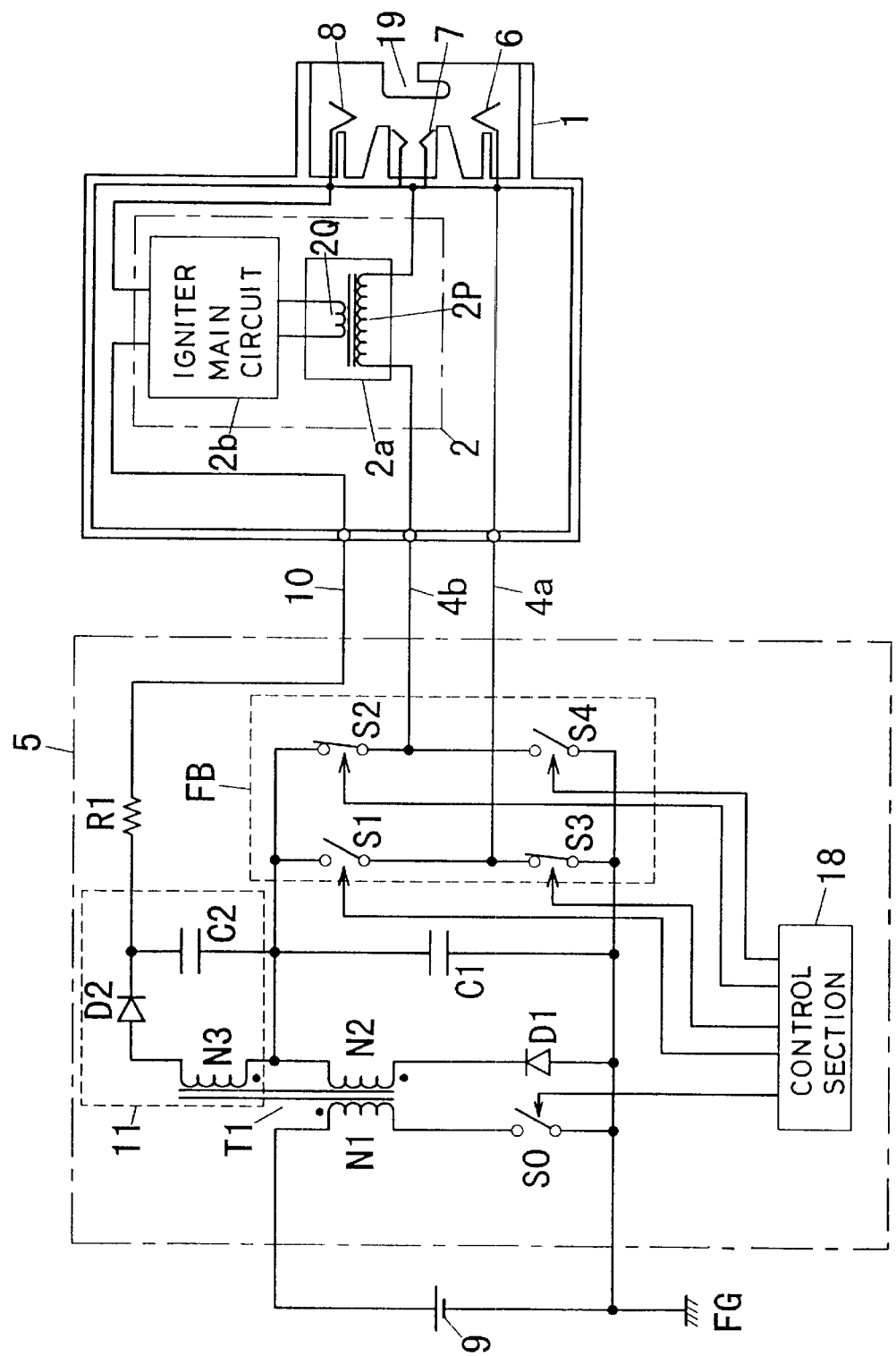
FIGS. 3–6 are respectively circuit diagrams of other embodiments of the present invention.

In another embodiment of the present invention as shown in FIG. 3, the same reference codes are given to the same constituents as the embodiment of FIG. 1 to omit overlapping description. In this embodiment of FIG. 3, the interior arrangement of the lighting circuit 5 of FIG. 1 is as in the followings. First, a series circuit of a primary winding N1 of a fly-back transformer T1 and a switching element S0 is connected across the DC power source 9, a secondary winding N2 of the fly-back transformer T1 is connected at one end to the cathode of a diode D1 and at the other end to a tertiary winding N3 of the fly-back transformer T1, and a capacitor C1 is connected between the other end of the secondary winding N2 and the anode of the diode D1. Further, to one end of the tertiary winding N3 of the fly-back transformer T1 not connected to the secondary winding N2, the anode of a diode D2 is connected, and a capacitor C2 is connected between the other end of the tertiary winding N3 and the cathode of the diode D2. Here, a DC voltage circuit 11 is constituted by the tertiary winding N3 of the fly-back transformer T1, diode D2 and capacitor C2.

Across the capacitor C1, a series circuit of switching elements S1 and S3 as well as a series circuit of switching elements S2 and S4 are connected, the output line 4a is led out from a junction point of the switching elements S1 and S3 and is connected to the outer electrode 6 of the lamp socket 1, and the output line 4b is led out from a junction point of the switching elements S2 and S4 and is connected to the secondary winding 2P of the Pulse transformer 2a in the starting circuit 2. Here, a bridge circuit FB is constituted by the switching elements Junction point of the diode D2 and capacitor C2 is connected to an end of a resistor R1, while the other end of this resistor R1 is connected, as the power supply line 10, to the igniter main circuit 2b of the starting circuit 2. Further, the DC power source 9 is connected on negative side to the ground FG.

Referring to the operation of the discharge lamp lighting device constituted as in the foregoing, the DC power source 9 causes a predetermined voltage (for example, 300–500 V upon starting the discharge lamp) to be generated across the bridge circuit FB (across the capacitor C1), by a switching operation of the switching element S0 in a DC/DC converter constituted by the fly-back transformer T1, switching element S0, diode D1 and capacitor C1. At this time, a predetermined voltage is also generated at the capacitor C2 through the tertiary winding N3 of the fly-back transformer T1.

In starting the discharge lamp, here, the switching elements S2 and S3 in the bridge circuit FB are 30 controlled by the control section 18 as to be ON, and the predetermined voltage required for starting the discharge lamp is applied between the central and outer electrodes 7 and 6 in the lamp socket 1. In the event where the discharge lamp is mounted to the lamp socket 1, the DC voltage is applied to the igniter main circuit 2b in the starting circuit 2 through a path of the capacitor C2→resistor R1→igniter main circuit 2b of the starting circuit 2→auxiliary electrode 8 in the lamp socket 1→electrodes (not shown) of the discharge lamp connected to the auxiliary and outer electrodes 8 and 6 of the lamp socket 1→outer 6 of the lamp socket 1→output line 4a→switching element S3→capacitor C1→capacitor C2, a current flows through the primary winding 2Q of the pulse transformer 2a, and the high voltage pulse is generated at the secondary winding 2P, to start the discharge lamp.

When on the other hand the bridge circuit FB is so controlled as to turn the switching elements S1 and S4, the required voltage for starting the discharge lamp is applied between the central and outer electrodes 7 and 6 in the lamp socket 1, whereas the voltage applied to the igniter main circuit 2b in the starting circuit 2 will be the voltage across the capacitor C2 only.

As has been described, the voltage of the capacitor C1 which is an output voltage of the bridge circuit FB and the voltage of the capacitor C2 which is an output voltage of the DC voltage circuit 11 are applied to the starting circuit 2 in a manner of additive polarity, by controlling the bridge circuit FB so as to turn the switching elements S2 and S3 ON, that is, a voltage including the output voltage of the bridge circuit FB is supplied to the starting circuit 2, so that the voltage of the capacitor C2 or the number of turns of the tertiary winding N3 of the fly-back transformer T1 can be reduced, and the dimensional minimization and cost reduction can be attained.

After the discharge lamp has been lighted, the voltage supplied to the discharge lamp from the lighting circuit 5 is lowered to a voltage at which the discharge lamp stably lights, and the voltage supplied to the starting circuit 2 does not reach the voltage enough for generating the high voltage pulse, whereby the starting circuit 2 stops, and an alternating current is applied to the discharge lamp through the output lines 4a and 4b with a switching operation in which the switching elements S1 and S3 as well as the switching elements S2 and S4 in the bridge circuit FB are respectively alternately turned ON while the switching elements S1 and S4 as well as the switching elements S2 and S3 at diagonal position are respectively simultaneously turned ON, and the discharge lamp is stably lighted.

Now, in the circuit shown in FIG. 3, the voltage supplied to the starting circuit 2 through the power supply line 10 can be optionally set by modifying the value of the tertiary winding N3 of the transformer T1, capacitor C2 or resistor R1, so that the starting circuit 2 can obtain a desired supply power by optimumly setting the supply power without enlarging the pulse transformer 2a or providing any boosting circuit in the socket, and any increase in the dimensions, weight and costs of the lamp socket incorporating the starting circuit 2 can be prevented.

Figure 4:
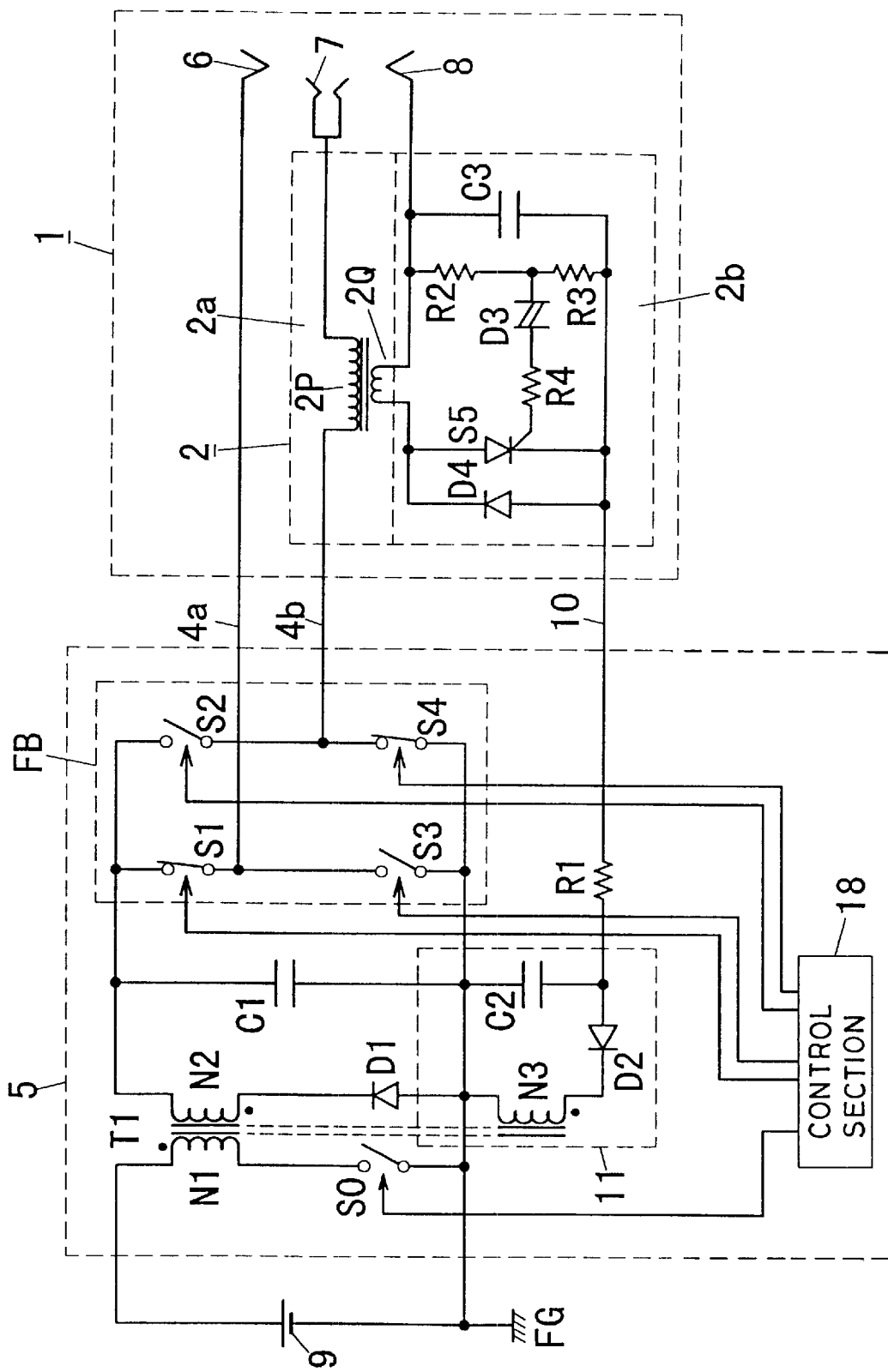

In another embodiment shown in FIG. 4 of the present invention, the same constituent elements as in the embodiment of FIG. 3 are denoted by the same reference codes and any description of overlapping portions shall be omitted. In FIG. 4, the difference from the embodiment of FIG. 3 resides in that the DC voltage circuit 11 is constituted for generating a negative voltage with respect to the ground FG (such stable potential as a potential substantially equal to the casing), and that the igniter main circuit 2b is constituted by, in concrete, a capacitor C3, resistors R2–R4, a trigger element D3, a thyristor S5 which is a switching, and semiconductor element, and a diode D4.

That is, in the DC voltage circuit 11, the tertiary winding N3 of the fly-back transformer T1 forming the circuit is connected at one end to the anode of the diode D1 and at the other end to the cathode of the diode D2, and the capacitor C2 is connected between the one end of the tertiary winding N3 and the anode of the diode D2. An end of the resistor R1 is connected to a junction point between the anode of the diode D2 and the capacitor C2, and the other end of the resistor R1 is connected, as the power supply line 10, to the igniter main circuit 2b of the starting circuit 2.

In the igniter main circuit 2b, the capacitor C3 is connected between the power supply line 10 and the auxiliary electrode 8, and a series circuit of the resistors R2 and R3 is connected across the capacitor C3. A junction point between these resistors R2 and R3 is connected, through the trigger element D3 and resistor R4, to the gate of the thyristor S5 connected across the capacitor C3 and in series with the primary winding 2Q of the pulse transformer 2a. To this thyristor S5, the diode D4 is connected in inverse parallel.

Referring to the operation of the present discharge lamp lighting device constituted as in the above, a predetermined voltage is caused to be generated across the bridge circuit FB by means of the DC/DC converter constituted by the fly-back transformer, switching element S0, diode D1 and capacitor C1, the switching elements S1 and S4 are made in ON state, and the required voltage for starting the discharge lamp is applied between the central and outer electrodes 7 and 6 of the lamp socket 1.

At the same time, so long as the discharge lamp is mounted to the lamp socket 1, the predetermined voltage is also generated across the capacitor C2 by means of the tertiary winding N3 of the fly-back transformer T1, and a voltage is charged in the capacitor C3 for charging the igniter main circuit 2b, with a current path of the capacitor C2→capacitor C1→switching element S1→outer electrode 6 of the lamp socket 1→electrode (not shown) of the discharge lamp connected to the auxiliary and outer electrodes 8 and 6 of the lamp socket 1→auxiliary electrode 8 of the lamp socket 1→capacitor C3→resistor R1→capacitor C2. As divided voltages of the voltage across the capacitor C3 by means the resistors R2 and R3 exceed a trigger voltage of the trigger element D3, the thyristor S5 turns ON, a current is caused to flow to the primary winding 2Q of the pulse transformer 2a, and the high voltage pulse is applied to the secondary winding 2P to have the discharge lamp started.

Since as shown in FIG. 4 the DC voltage circuit 11 is constituted so as to generate the negative voltage with respect to the ground potential substantially equal to the casing of the discharge lamp lighting device for housing the lighting circuit 5 and so on, it is possible to render the voltage of the power supply line 10 smaller than in the case of FIG. 3, and to render the structure of the discharge lamp lighting device to be smaller in the withstanding voltage so as to be dimensionally minimized.

Figure 5:
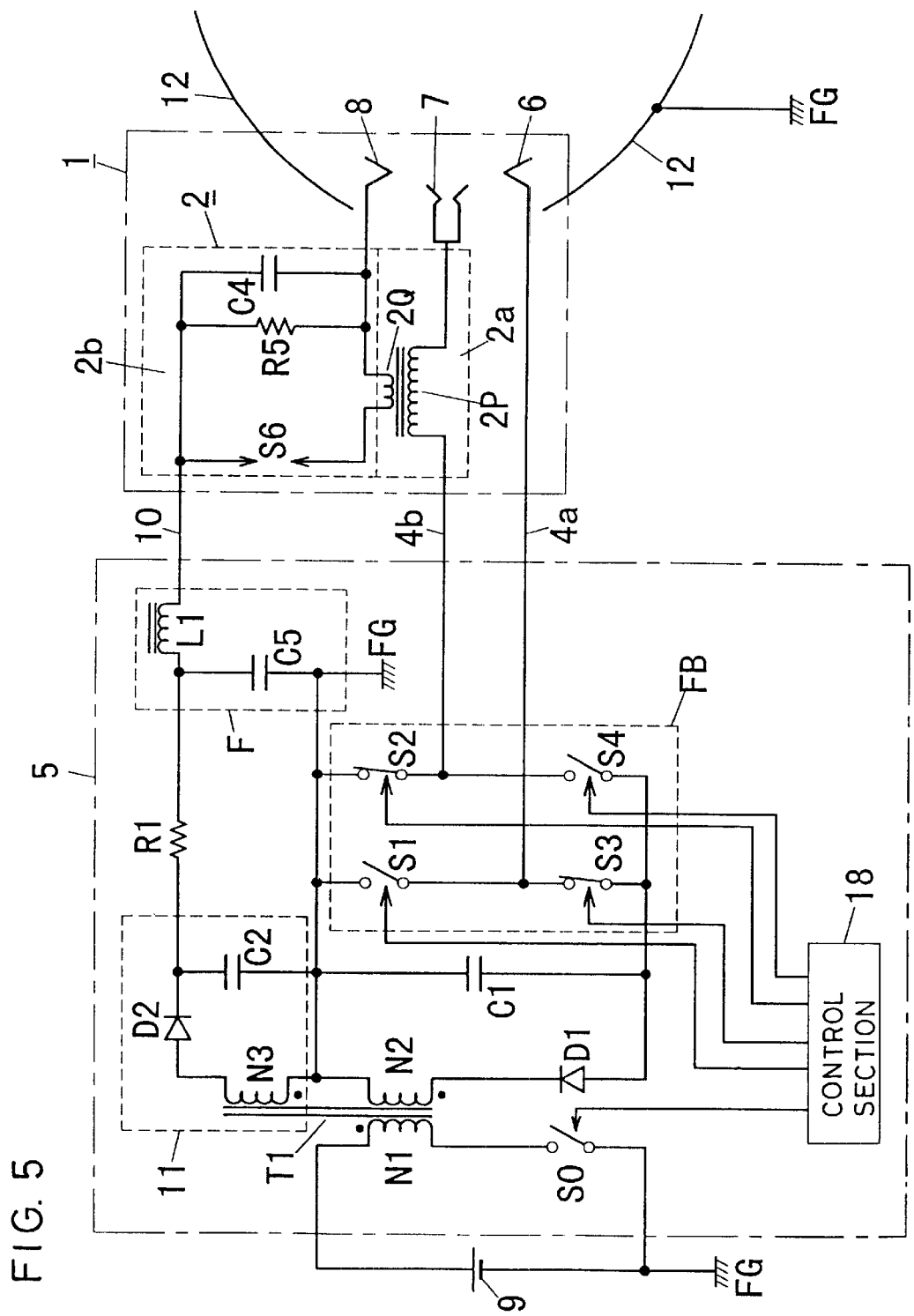

Referring to another embodiment of the present invention as shown in FIG. 5, the same constituent elements as in FIG. 3 are denoted by the same reference codes in FIG. 5, and any overlapping parts are omitted. In FIG. 5, the difference from the embodiment of FIG. 3 exists in respect that the junction point side of the switching elements S1 and S2 of the bridge circuit FB is connected to the ground FG to be substantially equal potential to the casing which houses the lighting circuit 5; that the igniter main circuit 2b of the starting circuit 2 is constituted by a capacitor C4, a discharging resistor R5 and a spark (discharge) gap S6 which is a switching element; and that a filter circuit F comprising a capacitor C5 and an inductor L1 is connected to the output of the DC voltage circuit 11. In FIG. 5, a reflector 12 for adjusting the distribution of light of the discharge lamp is provided to the lamp socket 1 and is connected to the ground FG to be rendered equal potential to the casing.

More specifically, the inductor L1 in the filter circuit F is connected at one end to the resistor R1 connected to the DC voltage circuit 11 in the lighting circuit 5, and at the other end through the power supply line 10 to one end of the capacitor C4 in the igniter main circuit 2b, while the other end of the capacitor C4 is connected to the auxiliary electrode 8 of the lamp socket 1. To the junction point of the resistor R1 to the inductor L1, the capacitor C5 is connected at one end, the other end of which is connected to the junction point between the switching elements S1 and S2 in the bridge circuit FB connected to the ground FG. In the igniter main circuit 2b, the resistor R5 is connected across the capacitor C4, and a series circuit of the spark gap S6 and the primary winding 2Q of the pulse transformer 2a is connected across the resistor R5.

Referring to the operation of the discharge lamp lighting device constituted as in FIG. 5, the predetermined voltage is generated across the bridge circuit FB (i.e., across the capacitor C1) by means of the DC/DC converter constituted by the fly-back transformer T, switching element S0, diode D1 and capacitor C1, the switching elements S2 and S3 are controlled to be ON state, and the required voltage for starting the discharge lamp is applied between the central and outer electrodes 7 and 6 of the lamp socket 1.

At the same time, so long as the discharge lamp is mounted to the lamp socket 1. the predetermined voltage is also generated across the capacitor C2 by means of the tertiary winding N3 of the fly-back transformer T1, and the voltage is charged in the capacitor C4 of the igniter 2b through a path of the capacitor C2→resistor R1→inductor L1→capacitor C4→auxiliary electrode 8 of the lamp socket 1→electrodes (not shown) of the discharge lamp connected to the auxiliary and outer electrodes 8 and 6 of the lamp socket 1→outer electrode 6 of the lamp socket→switching element S3→capacitor C1→capacitor C2. As the voltage across the capacitor C4 exceeds the trigger voltage of the spark gap S6, the gap is made ON to cause a current to flow to the primary winding 2Q of the pulse transformer 2a, and the high voltage pulse is applied to the secondary winding 2P to have the discharge lamp started.

Since in the present embodiment the output voltage of the bridge circuit FB is made to be negative potential with respect to the potential of the casing by connecting the junction point of the switching elements in the bridge circuit FB to the ground, it is possible to light the discharge lamp at the negative potential as compared with the casing (reflector 12) to be able to prolong the life of the discharge lamp, in addition to the effect described in the foregoing embodiments.

Figure 6:
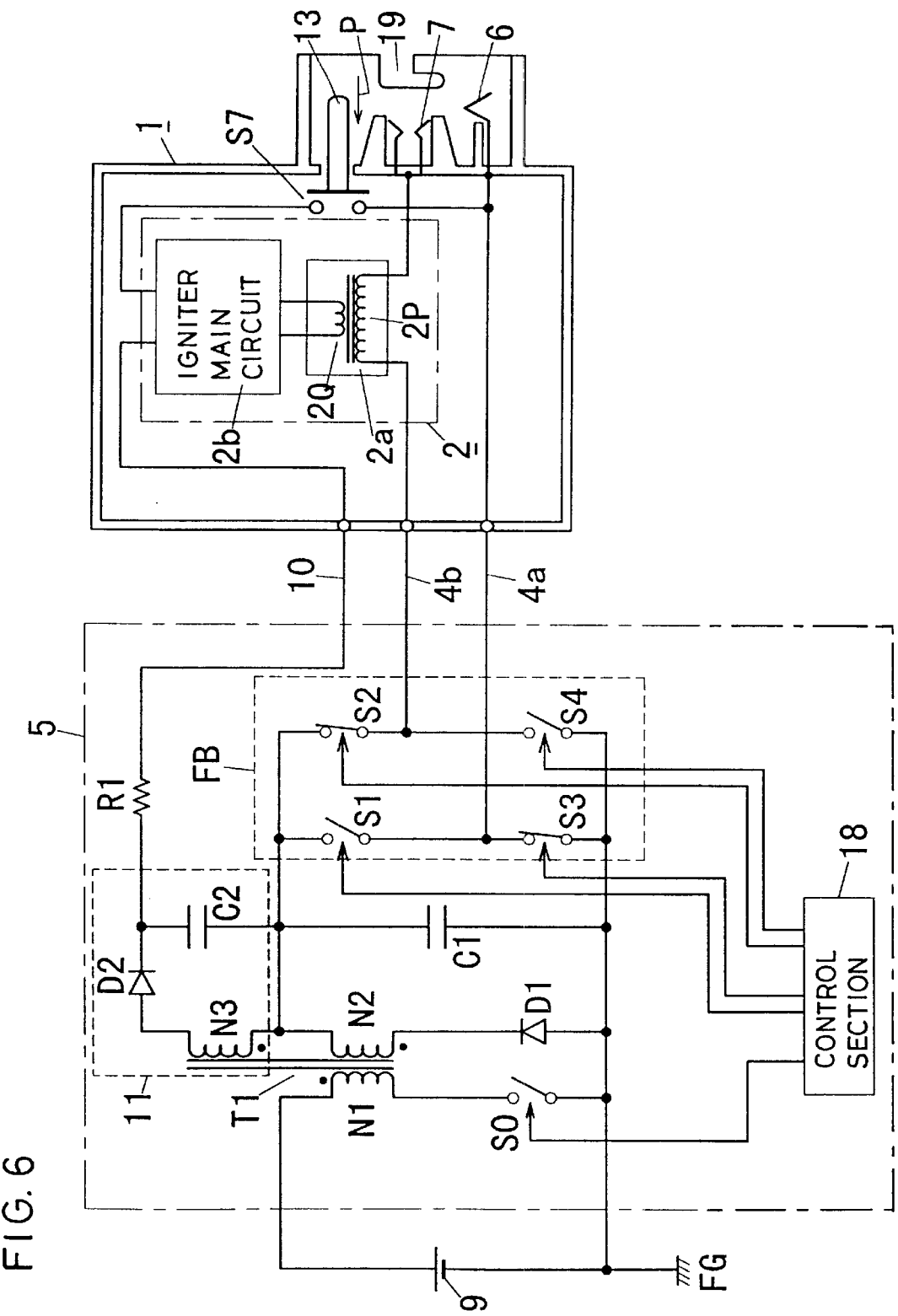

In another embodiment of the present invention as shown in FIG. 6, the same constituting elements as the embodiment of FIG. 3 are denoted by the same reference codes and their description is omitted. In FIG. 6, the difference from the embodiment of FIG. 3 exists in that the lamp socket 1 is provided with a mechanism part 13 which is pushed in mounting direction (P direction) of the discharge lamp as the lamp is mounted to the lamp socket 1, so as to move into ON position a mechanism switch S7 provided between an end on the side not connected to the power supply line 10 and the output line 4a in the igniter main circuit 2b.

For this reason, once the discharge lamp is mounted to the lamp socket 1, and in contrast to the embodiment of FIG. 3 wherein the DC voltage is applied to the starting circuit 2 through the path of the capacitor C2→resistor R1→igniter main circuit 2b of the starting circuit 2→auxiliary electrode 8 of the lamp socket 1→electrode (not shown) of the discharge lamp and connected to the auxiliary and outer electrodes 8 and 6→outer peripheral electrode 6 of the lamp socket 1→output line 4a→switching element S3→capacitor C1→capacitor C2, the DC voltage is applied to the starting circuit 2 in the present embodiment in FIG. 6 through the path of the capacitor C2→resistor R1→igniter main circuit 2b of the starting circuit 2 mechanism switch S7→output line 4a→switching element S3→capacitor C1 capacitor C2. Here, in FIG. 6, the auxiliary electrode 8 is not provided to the lamp socket 1.

In the embodiment of FIG. 6, the power is not to be supplied to the starting circuit 2 through the electrodes of the discharge lamp as in the embodiment of FIG. 3, but the power is supplied to the starting circuit 2 with the switch mechanism provided in the lamp socket 1 and comprising the mechanism switch S7 and mechanism part 13, the mechanism being switched over to be ON when the discharge lamp is mounted to the lamp socket 1.

Since in the present embodiment the arrangement is not to supply the power to the starting circuit 2 through the auxiliary and outer electrodes 8 and 6 of the lamp socket 1 as in the embodiment of FIG. 3, it is possible to supply from the lighting circuit 5 the DC voltage which takes no part in the output voltage of the bridge circuit FB, by means of such two lines as the power supply line 10 and a power line led from the lighting circuit 5 other than the output line 4a connected to the outer electrode 6 .

In this case, further, any other conducting substance than the electrode may be provided at the lamp base of the discharge lamp, to supply the power through this substance to the starting circuit 2.

Further, in the respective embodiments, the lighting and starting circuits 5 and 2 and lamp socket 1 may be formed to be integral.

While in the respective foregoing embodiments the description has been made to that the inverter section of the lighting circuit 5 is constituted by the DC/DC converter of fly-back system (fly-back transformer T1, switching element S0, diode D1 and capacitor C1) and the full-bridge inverter (bridge circuit FB) and to that the DC voltage circuit 11 is constituted by the tertiary winding N3 of the fly-back transformer T1, diode D2 and capacitor C2, it is of course possible to employ any other circuit arrangement, since the gist of the present invention resides in that the power feeding means is so provided that the DC voltage is supplied from the lighting circuit to the starting circuit inside the socket only when the discharge lamp is mounted to the socket. For example, the DC voltage circuit 11 of the present embodiment may be a multistage rectifying circuit (such as a Yuckcroft-Walton circuit) connected to both ends of the secondary winding N2 of the transformer T1 and constituted by the capacitor and diode.

Figure 7:
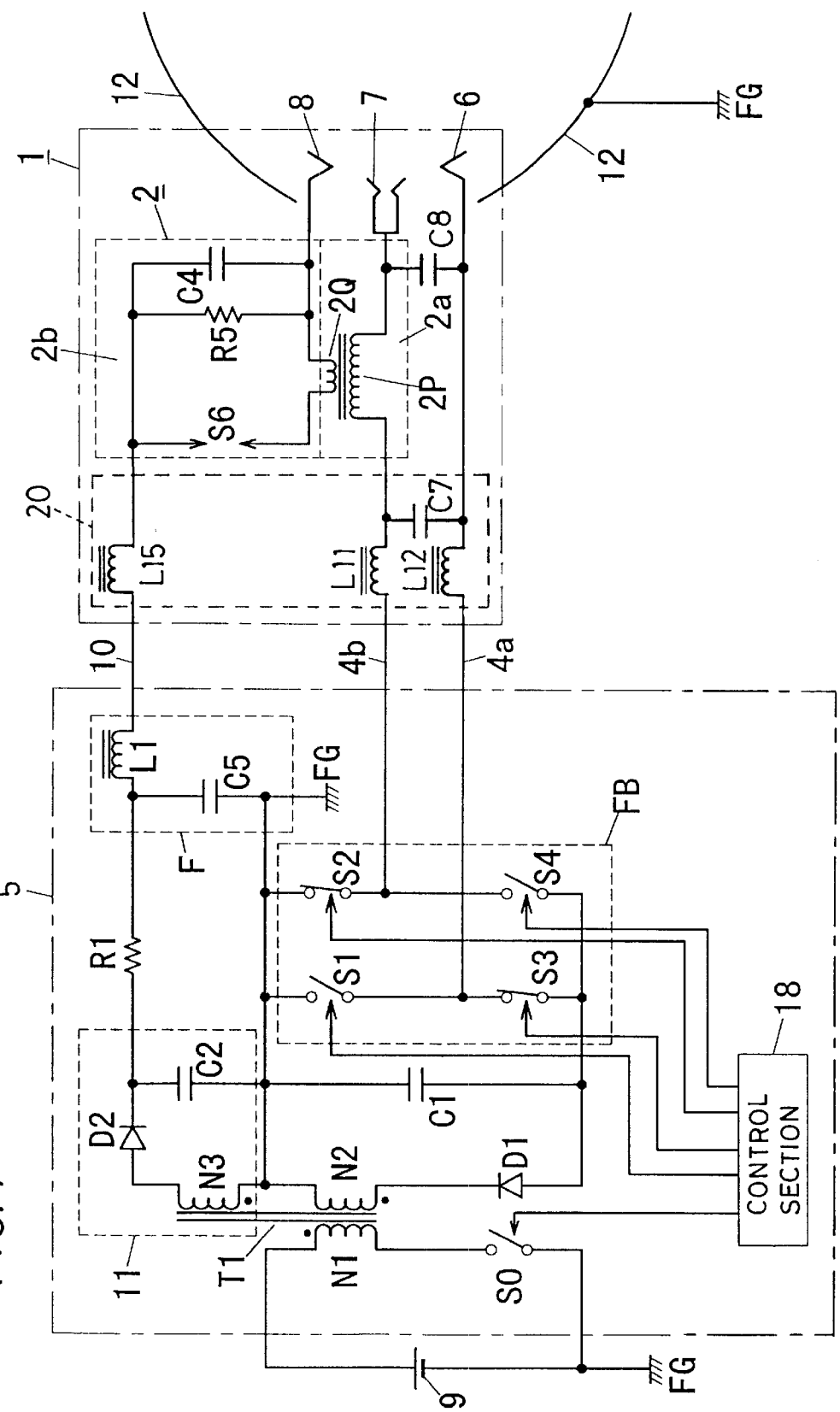
FIGS. 7 and 8 are respectively circuit diagrams of other embodiments of the present invention.

In another embodiment of the present invention as shown in FIG. 7, a series circuit of the primary winding N1 of the fly-back transformer T1 and switching element S0 is connected across the DC power source 9, an end of the secondary winding N2 of the fly-back transformer T1 is connected to the cathode of the diode D1, the other end of the secondary winding N2 is connected to an end of the tertiary winding N3 of the fly-back transformer T1, and the capacitor C1 is connected between the other end of the secondary winding N2 and the anode of the diode D1. An end of the tertiary winding N3 of the fly-back transformer T1 other than the end connected to the secondary winding N2 is connected to the anode of the diode D2, and the capacitor C2 is connected between the one end of the tertiary winding N3 and the cathode of the diode D2.

Across the capacitor C1, a series circuit of the switching elements S1 and S3 and a series circuit of the switching elements S2 and S4 are connected, and the respective switching elements S1–S4 forming the full bridge circuit are controlled by a control circuit 18. Junction point of the diode D2 and capacitor C2 is connected to an end of current-limiting resistor R1, and the other end of this resistor R1 is connected through a filter circuit F comprising a capacitor C5 and inductor L1 to the starting circuit 2. With these switching elements S0–S4, fly-back transformer T1, diodes D1 and D2, capacitors C1 and C2, resistor R1 and control circuit 18, the lighting circuit 5 is constituted.

Junction point of the switching elements S2 and S4 is connected through an inductor L11 and secondary winding 2P of the pulse transformer 2a to the central electrode 7, and junction point of the switching elements S1 and S3 is connected through an inductor L12 to the outer electrode 6. To the other end of the resistor R1, an end of inductor L15 is connected through the filter circuit F to the other end of the resistor R1, and a parallel circuit of a resistor R5 and capacitor C4 as well as a series circuit of the primary winding 2Q and discharge gap S6 are connected between the other end of the inductor L15 and the auxiliary electrode 8.

A capacitor C7 is connected between junction point of the inductor L11 to the pulse transformer and junction point of the inductor L12 to the outer electrode 6, and a capacitor C8 is connected between both ends of the central and outer electrodes 7 and 6. With these inductors L11, L12 and L15 and capacitor C7, a filter circuit 20 is constituted, and the starting circuit 2 is constituted by this filter circuit 20, capacitors C8 and C4, discharge gap S6, pulse transformer 2a and resistor R5. This starting circuit 2 is incorporated in the lamp socket 1.

Referring to the operation of the discharge lamp lighting device constituted as has been described, the DC power source 9 causes a predetermined voltage generated across the bridge circuit of the switching elements S1–S4 (across the capacitor C1) with the switching operation of the switching element S0 in the DC/DC converter constituted by the fly-back transformer T1, switching element S0, diode D1 and capacitor C1. At this time, the predetermined voltage is also generated at the capacitor C2 through the tertiary winding N3 of the fly-back transformer T1.

Here, upon starting the discharge lamp, the switching elements S2 and S3 are controlled by the control circuit 18 to be turned ON, and the capacitor C4 is charged by the voltage generated at the capacitors C1 and C2 through a path of the capacitor C1 capacitor C2→resistor R1→inductors L1 and L15→capacitor C4→auxiliary electrode 8 electrode of the discharge lamp→outer electrode 6→inductor L12→switching element S3→capacitor C1. As this charged voltage exceeds a trigger voltage of the discharge gap S6, a current flows to the primary winding 2Q of the pulse transformer 2a, a high voltage pulse is generated at the pulse transformer, the high voltage pulse is applied to the discharge lamp through a path of the secondary winding 2P of the pulse transformer→discharge lamp and capacitor C8→capacitor C7→secondary winding 2A of the pulse transformer, and the discharge lamp is started.

After the start of the discharge lamp, an alternating voltage of rectangular wave form is applied to the discharge lamp from the junction points of the switching elements S1 and S3 and of the switching elements S2 and S4 and through the starting circuit 2, by means of the switching operation of the switching elements S1–S4 forming the bridge circuit in the lighting circuit 5, and the discharge lamp is stably lighted.

As in the above, there are provided three input lines including the input lines 4a and 4b for supplying the power for stably lighting the discharge lamp as led from the junction points of the switching elements S1 and S3 and of the switching elements S2 and S4 to the starting circuit 2, and the additional power supply line 10 for supplying the power for actuating the starting circuit 2 as led from the resistor R1 to the starting circuit 2. These input and power supply lines are so arranged as to connect the lighting circuit 5 through the inductors L11, L12 and L15 to the starting circuit 2, so that the respective lines will have a filter effect, any high frequency current generated upon polarity inversion of the discharge lamp can be effectively prevented from flowing to the lighting circuit 5, and any electromagnetic waves radiated from the discharge lamp lighting device to the ambience can be effectively restrained.

Further in the circuit of FIG. 7, the capacitor CB is connected in parallel to both ends of the discharge lamp, so that a loop through which the high frequency current flows as generated upon the polarity inversion of the discharge lamp can be shortened and the electromagnetic waves radiated to the ambience can be restrained.

Figure 9:
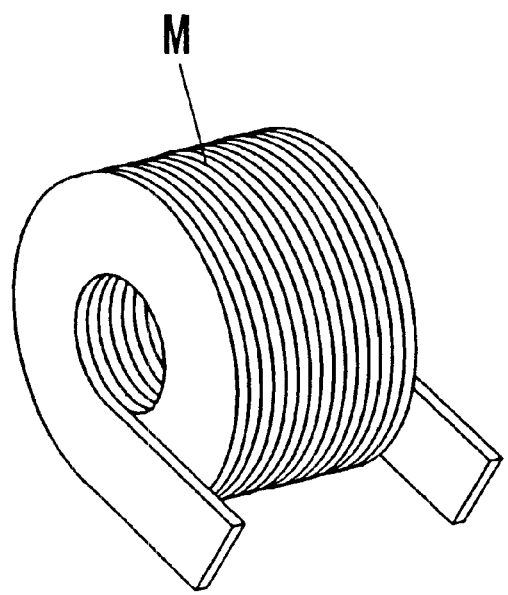
FIG. 9 is a partial perspective view of a pulse transformer employed in the embodiment of FIG. 8.
Figure 8:
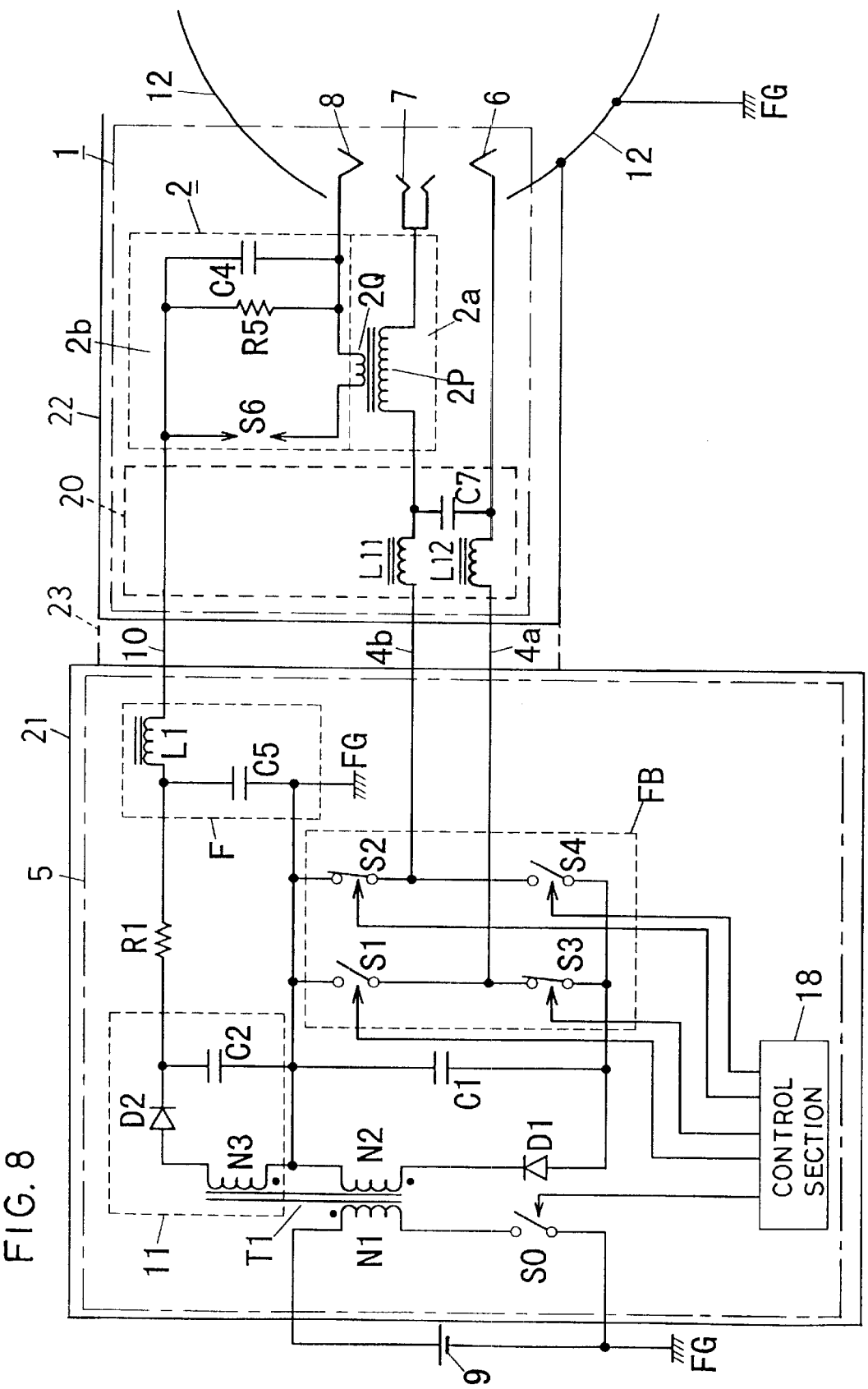

In another embodiment of the present invention as shown in FIG. 8, there resides the difference from the embodiment shown in FIG. 7 in respect that no capacitor C8 is connected to both ends of the discharge lamp, and that the inductor L15 for the power supply line 10 to the starting circuit 2 is omitted. Even with such circuit arrangement, too, an attempt to render line-to-line capacity of the secondary winding 2P of the pulse transformer to be larger (such as a sectional winding or an edgewise winding of flat type copper wire as shown in FIG. 9) is adopted, so that there can be formed a high frequential loop of the discharge lamp→central electrode line-to-line suspended capacity→capacitor C7→outer electrode→discharge lamp, and a lighting device which gives to others no remarkable noise influence can be realized.

Further, as the inductor L15 is not of the loop for flowing the lamp current of the discharge lamp, no current flows once the discharge lamp is lighted. As the rectangular wave current flows through the output lines 4a and 4b of the current to the discharge lamp, the inductors L11 and L12 are required for not transmitting to the exterior any high frequency noise generated around the discharge lamp, but the inductor L15 of the loop in which the rectangular wave current takes no part can be omitted. Further, in the embodiment of FIG. 8, in addition to the embodiment of FIG. 7, the socket 1 incorporating the starting circuit 2 and filter circuit 20 is covered by a metal case 22 provided at the mounting part of the discharge lamp with an aperture. The lighting circuit 5 is also covered by a metal case 21 similarly provided. The lines 4a, 4b and 10 connecting between the lighting circuit 5 and the lamp socket 1 are covered by a shield wire 23 which electrically connects between the metal cases 21 and 22. The metal case 22 is electrically connected to the reflector 12. With this arrangement, a lighting device giving to the exterior less influence of radiated noise can be provided.

Figure 10:
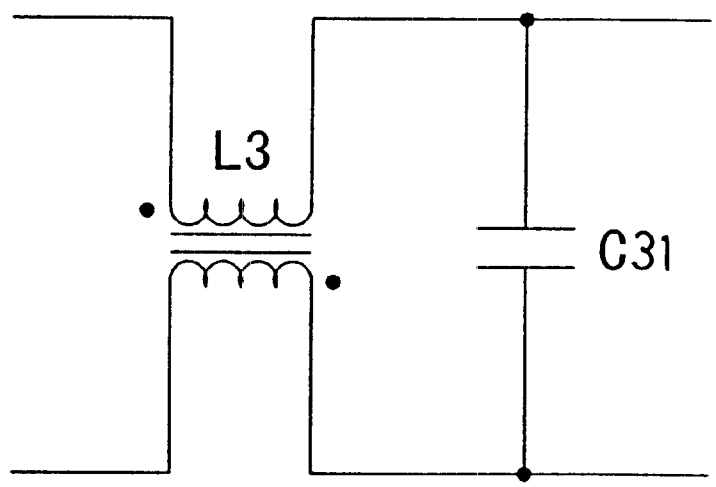
FIGS. 10 and 11 are circuit diagrams of filters respectively employable in the embodiment of FIG. 8.
Figure 11:
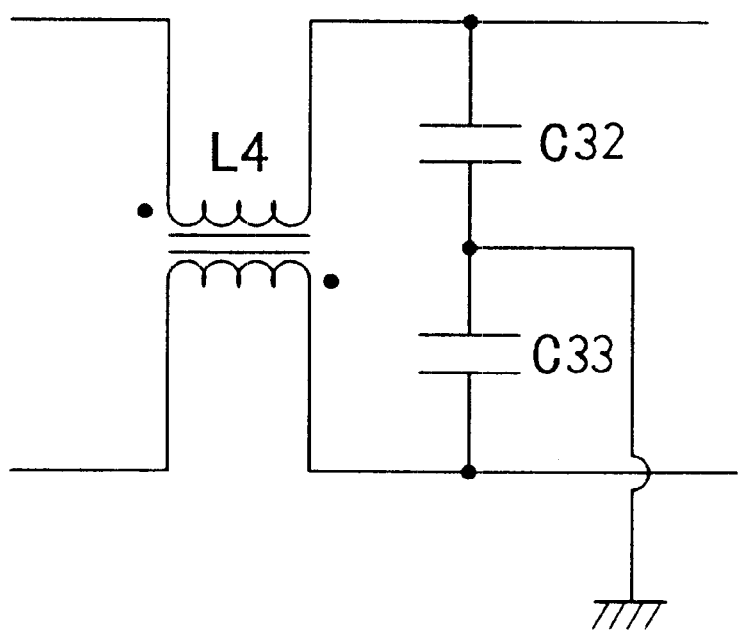

Further, while the constitution of the filter circuit here has been described only with reference to the inductors L11 and L12 and capacitor C7, it is of course possible to employ such filter circuits as shown in FIGS. 10 and 11 (while in FIG. 11 a junction point of capacitors C32 and C33 is provided), as being within the scope of the present invention.

While in the embodiments of the present invention the lighting circuit 5 has been described as being constituted by the DC/DC converter of fly-back system and the full bridge inverter, the circuit is not limited thereto. As regards the arrangement for operating the starting circuit 2, too, any other circuit arrangement may be adopted within the extent of not deviating from the gist of the present invention.

What is claimed is:

1. A discharge lamp lighting device comprising:
    a discharge lamp having a lamp base including a first central electrode and
    an outer peripheral electrode surrounding the first central electrode,
    a lighting circuit for lighting the discharge lamp,
    a starting circuit for starting the discharge lamp to have it lighted, and
    a lamp socket to which the lamp base of the discharge lamp is mounted,
    wherein the lamp socket is provided integral with the starting circuit and includes a second central electrode to be connected to the first central electrode of the lamp base and outer and auxiliary electrodes to be connected to the outer peripheral electrode of the lamp base when the lamp base is mounted to the lamp socket, and
    the device further comprises a power supply means including a pair of lighting output lines and a power supply line, at least one of the lighting output lines supplying a lighting output of the lighting circuit through the starting circuit to the first and second central electrodes, the power supply line being connected through the starting circuit to the auxiliary electrode of the lamp socket, and the power is supplied to the starting circuit when the lamp base of the discharge lamp is mounted to the lamp socket by connecting through: the outer peripheral electrode of the lamp base connected to the outer electrode of the lamp socket when mounted thereto, the auxiliary electrode, the other output line, the lighting circuit and the power supply line.

2. The discharge lamp lighting device according to claim 1 wherein a DC voltage is applied from the lighting circuit through one of the lighting output lines to the power supply line toward the starting circuit.

3. The discharge lamp lighting device according to claim 2 wherein the starting circuit includes a pulse transformer, the DC voltage applied to the power supply line toward the starting circuit supplying a power to the pulse transformer for generating a high voltage pulse toward the discharge lamp.

4. The discharge lamp lighting device according to claim 2 wherein the lighting circuit includes a bridge circuit controlled to include in the DC voltage an output voltage of the bridge circuit.

5. The discharge lamp lighting device according to claim 4 wherein the device further comprises a casing for the lighting circuit, and the output voltage of the bridge circuit is of a negative potential with respect to the casing.

6. The discharge lamp lighting device according to claim 1 wherein the starting circuit includes a switching element comprising a semiconductor element, and is arranged for generating in the starting circuit a high voltage pulse with a switching operation of the switching element.

7. The discharge lamp lighting device according to claim 1 wherein the starting circuit includes a switching element comprising a spark gap, and is arranged for generating in the starting circuit a high voltage pulse with a switching operation of the switching element.

8. The discharge lamp lighting device according to claim 1 wherein the lighting circuit, starting circuit and socket are provided integral.

9. The discharge lamp lighting device according to claim 1 wherein the power supply means is arranged for supplying the power to the starting circuit through one of electrodes of the discharge lamp.

10. The discharge lamp lighting device according to claim 1 wherein the power supply means is arranged for supplying the power to the starting circuit through other conducting substance than electrodes of the discharge lamp.

11. The discharge lamp lighting device according to claim 1 wherein the power supply means is arranged for supplying the power to the starting circuit upon changing over of a switch mechanism provided in the socket and occurring upon mounting of the discharge lamp to the socket.

12. The discharge lamp lighting device according to claim 1 wherein a filter circuit is provided in the starting circuit on an input side from the lighting circuit.

13. The discharge lamp lighting device according to claim 12 wherein the filter circuit comprises an inductor and a capacitor.

14. The discharge lamp lighting device according to claim 12 wherein a capacitor is connected in respect of the starting and filter circuits to be in parallel to the discharge lamp.

15. The discharge lamp lighting device according to claim 12 wherein the input lines for leading inputs from the lighting circuit to the starting circuit are three in number, and the filter circuit in the starting circuit is provided for providing a filter effect to each input line.

16. The discharge lamp lighting device according to claim 1 wherein the socket incorporates therein the starting circuit and is covered with a conducting case, and the output lines and power supply line connecting the socket incorporating the starting circuit to the lighting circuit are shielded by a conductive substance electrically connected to the conducting case.

17. The discharge lamp lighting device according to claim 1 wherein the starting circuit is provided with a transformer for supplying through a secondary winding thereof a high voltage pulse to the discharge lamp, the secondary winding being wound to be enlarged in line-to-line capacity.

18. The discharge lamp lighting device according to claim 17 wherein the secondary winding of the transformer is of an edgewise winding of a flat type copper wire wound to be in piles in thickness direction.

19. The discharge lamp lighting device according to claim 17 wherein the secondary winding of the transformer is of a multiplex winding.

20. The discharge lamp lighting device according to claim 1 in which the starting circuit includes a transformer for supplying through a secondary winding thereof a high voltage pulse to the discharge lamp, the secondary winding being wound to be enlarged in the line capacity, wherein a capacitor is provided as connected in parallel to the secondary winding of the transformer.

21. A discharge lamp lighting device comprising a discharge lamp, a lighting circuit for lighting the discharge lamp, a starting circuit for starting the discharge lamp, and a socket to which the discharge lamp is mounted, a power supply means is further provided, the means including a pair of lighting output lines at least one of which connects the lighting circuit through the starting circuit to the discharge lamp for stably lighting the discharge lamp, and a power supply line for supplying a power to the starting circuit, the arrangement being such that the power is supplied to the starting circuit when the discharge lamp is mounted to the socket, and the lighting circuit, starting circuit and socket are provided integral; wherein a conducting case covering the starting circuit is connected to the starting circuit through a capacitor included in the filter circuit.

22. A discharge lamp lighting device comprising a discharge lamp, a lighting circuit for lighting the discharge lamp, a starting circuit for starting the discharge lamp, and a socket to which the discharge lamp is mounted; a power supply means is further provided, the means including a pair of lighting output lines at least one of which connects the lighting circuit through the starting circuit to the discharge lamp for stably lighting the discharge lamp, and a power supply line for supplying a power to the starting circuit, the arrangement being such that the power is supplied to the starting circuit when the discharge lamp is mounted to the socket; and the lighting circuit, starting circuit and socket arc provided integral; wherein a conductive reflector is provided for adjusting the distribution of light of the discharge lamp, the reflector being connected to a conducting case covering the socket incorporating the starting circuit.

* * * * *